United States Patent [19]

Izuchi et al.

[11] Patent Number: 5,749,980
[45] Date of Patent: May 12, 1998

[54] METHOD FOR IMPROVING ALUMINUM ALLOY CAST STRUCTURAL MEMBER

[75] Inventors: Shuhei Izuchi; Tsuyoshi Matsumoto, both of Fujisawa, Japan

[73] Assignee: Kabushiki Kaisha Kobe Seiko Sho, Kobe, Japan

[21] Appl. No.: 681,517

[22] Filed: Jul. 23, 1996

Related U.S. Application Data

[62] Division of Ser. No. 297,113, Aug. 26, 1994, Pat. No. 5,576,112.

[30]   Foreign Application Priority Data

Aug. 28, 1993  [JP]  Japan .................................. 5-235765

[51] Int. Cl.$^6$ .................................................. B23K 26/14
[52] U.S. Cl. ...................... 148/525; 148/565; 219/121.64
[58] Field of Search ................................ 148/525, 565; 219/121.64

[56] References Cited

U.S. PATENT DOCUMENTS

| | | | |
|---|---|---|---|
| 4,750,945 | 6/1988 | Laslaz et al. | 148/437 |
| 5,115,770 | 5/1992 | Yen et al. | |
| 5,120,372 | 6/1992 | Yen et al. | |
| 5,558,786 | 9/1996 | Couch, Jr. et al. | 219/121.24 |

*Primary Examiner*—Melvyn Andrews
*Attorney, Agent, or Firm*—Oblon, Spivak, McClelland, Maier & Neustadt, P.C.

[57] ABSTRACT

An aluminum alloy casting is provided high weldability by consisting of 3.5 to 12.0 Wt % of Si and hydrogen in a limited content to be less than or equal to 0.3 cc per 100 g of alloy. The aluminum alloy casting thus has strength and ductility suitable for application to a joint for automotive frames.

16 Claims, 2 Drawing Sheets

METHOD FOR IMPROVING ALUMINUM ALLOY CAST STRUCTURAL MEMBER

This is a division of application Ser. No. 08/297,113 filed on Aug. 26, 1994, now U.S. Pat. No. 5,576,112.

BACKGROUND OF THE INVENTION

1. Field of the Invention

The present invention relates to an aluminum alloy casting having high laser weldability and high strength and ductility at a joint. The invention also relates to a technology for improving overall strength, fatigue strength, ductility and so forth of an aluminum alloy structural member subjecting only a part thereof to a thermal treatment (laser processing).

2. Description of the Related Art

In the recent years, in transporting equipments, such as automotive vehicles, railway vehicles, ships, and so forth, for demands better fuel economy and higher speed, lighter weight of structures per se and for lighter weight of structural members to be employed in the light-weight structures have been developed. For light-weight structural member, the members of aluminum alloy are becoming to be frequently employed in place of the conventional steel member for lighter weight.

As the aluminum alloy material, there are variety of materials, such as rolled material, extruded material, cast material and so forth depending upon difference of the production processes. Among these variety of aluminum alloy materials, rolled materials and extruded materials have relatively long stand achievement of use in the railway vehicles and ships. The rolled materials are processes into a desired configuration through press, bending and reducing process and so forth. The extruded material is shaped into a desired configuration of a hollow member and so forth corresponding to a configuration of dies. Such processed members are connected by welding, primarily by arc welding so as to be assembled into a structure.

On the other hand, the aluminum alloy casting has not been positively employed in a welded structure except for repair welding. Also, since the aluminum alloy casting has different mechanical performance of the products depending upon the size, thickness and applied portion and so forth, it may have relatively low reliability. This is also one of the reasons why the aluminum alloy casting has small field of application.

U.S. Pat. No. 4,618,163 discloses an automobile chassis made from extruded light metal tubular rods held together by connecting members also made from light metal. The connecting members are die cast or forged members. It has been known a technology for constructing an automotive chassis structure by connecting the extruded frame of the light metal by means of joints also made of the light metal, for achieving the weight reduction of the vehicle. The above-identified U.S. Patent further discloses employment of the die cast of the light metal as a material for the joints. However, the above-mentioned prior art fails to show what light metal may be used for die cast product nor what component would be a base material for the die cast product. Therefore, the above-identified U.S. Patent does not disclose the material which has superior property to the conventionally known light metal die cast. As mentioned above, the conventional aluminum alloy casting has lower welding performance and mechanical performance than the rolled, extruded or forged material and fluctuates in mechanical performance, application of the conventional aluminum alloy casting for the joint of the automotive chassis is not practically possible.

On the other hand, the aluminum alloy casting holds advantages since it is easily to form three dimensional arbitrary configuration, superior to the rolled material and extruded material. Therefore, it has been desired to develop a technology which may make use of the above-mentioned advantage with improvement of weldability and unevenness of the mechanical performance of the aluminum alloy casting.

Namely, concerning the weldability of the aluminum alloy casting, there have been attempted an improvement of the material per se, such as reduction of impurity elements of the casting or reduction of particle size for microstructure, and an improvement of a welding method by effecting improvement on the material of a welding wire to be supplied. Even through such attempts, the weldability and the mechanical strength of the aluminum alloy casting cannot be satisfactory improved for practical use. Therefore, when the conventional aluminum alloy casting is used for the welding joint, the ratio of strength of the welding joint versus the strength of the base material is relatively low, i.e. in the order of 60 to 80%. Therefore, such welding joint is defective since it may cause breakage at the welding metal portion.

On the other hand, an arc welding method encounters disadvantage for discharging of spatter and so forth to degrade appearance of the joint products to lower the value as a commercial products. If treatment for better appearance is to be performed for better appearance, it is inherent to perform post welding process to cause increasing of the process step and whereby to cause rising of the production cost.

Furthermore, due to high heat transfer coefficient and other property of the aluminum alloy, a large heat input is required for welding. The large heat input causes unnecessarily large amount of reinforcement of weld or to cause increased deformation. This is the critical disadvantage.

On the other hand, laser welding method has been frequently used for welding of steel materials utilizing high energy density, and has been put into practical use as high speed, high efficiency and low distortion welding method. In case of application of the laser welding method for aluminum material, it has not been applied in large scale for the reason that the aluminum material tends to reflect a laser beam and to form a defect, such as blow hole and so forth, at the weld metal.

Concerning the mechanical performance of the aluminum alloy casting, the strength and the ductility of the casting is variable depending upon the composition and type of heat treatment. However, in general, greater strength results in lower ductility, and conversely, increasing of ductility results in difficulty of maintaining sufficient strength. Therefore, in the prior art, it is common to determine the composition and the heat treatment condition for achieving a balance therebetween. Therefore, it has been impossible to increase both of the strength and the ductility of the casting.

For instance, as a technology for improving nonuniformity of the mechanical performance, there is a method for increasing the thickness of the structural member for assuring desired performance, such as strength and so forth. However, the increased thickness of the structural member inherently causes increasing of the weight, and more importantly to cause variation of the mechanical performance in the thickness direction.

It is also possible to perform heat treatment for improving the property of the aluminum alloy casting. By heat treatment, the ductility and strength of the aluminum alloy casting can be improved. However, the heat treatment for overall structure frequently causes deformation of the structure. Furthermore, effecting the heat treatment is not advantageous in viewpoint of the cost.

Furthermore, in the recent technology, there has been employed a structure for certainly provide security for the occupant of the vehicle, i.e. automotive vehicle, railway vehicle, ship and so forth, by providing lower strength at a portion of the structure so that deformation may be caused at the low strength portion upon exertion of impact for absorbing the impact, not only by strengthening a portion of the structure. In this case, it becomes necessary to form a portion having high ductility. Namely, when the impact is exerted, the low strength portion should not cause breakage but may cause deformation for successfully absorbing the impact. Therefore, it is essential to provide high ductility for the low strength portion.

However, it is difficult to provide high ductility for the arbitrarily selected position in the aluminum alloy casting. It should be noted that a method for increasing durability for the aluminum alloy cast component, such as a cylinder head and so forth by re-melting the aluminum alloy casting by irradiating a laser beam for necessary portion, has been disclosed in Japanese Unexamined Patent Publication No. 61-193773. However, in order to achieve satisfactory durability, further improvement , such as for alloy composition and so forth, is required.

SUMMARY OF THE INVENTION

It is therefore an object of the present invention to provide an aluminum alloy casting which has high laser weldability, improved mechanical property and uniformity of the mechanical property, and particularly, high ductility.

Another object of the invention is to provide an aluminum alloy casting suitable for a joint of an automotive framework and a casted aluminum alloy joint which has high ductility and satisfactory deformation characteristics upon impact.

A further object of the present invention is to provide a method for improving a property of an aluminum alloy casting for improving mechanical performance of a structural member made of aluminum alloy casting.

In order to accomplish the above-mentioned and other objects, an aluminum alloy casting, according to one aspect of the invention, contains 3.5 to 12.0 Wt % of Si and having a hydrogen content limited to be less than or equal to 0.3 cc per 100 g of alloy.

The aluminum alloy casting may further contain Fe limited in a content less than or equal to 0.10 Wt %. Additionally, the aluminum alloy casting may further contain at least one selected from a group of 0.05 to 0.6 Wt % of Mg and 0.1 to 0.6 Wt % of Cu.

In the preferred composition of the aluminum alloy casting, the hydrogen content is less than or equal to 0.15 cc per 100 g of alloy.

According to another aspect of the invention, an aluminum alloy casting having high laser weldability, is consisted of 3.5 to 12.0 WT % of Si, less than or equal to 0.10 Wt % of Fe, 0.3 cc per 100 g of alloy of H and remaining amount of aluminum and inevitable impurity.

According to a further aspect of the invention, a joint for connecting automotive frames formed of an aluminum alloy casting containing 3.5 to 12.0 Wt % of Si and having a hydrogen content limited to be less than or equal to 0.3 cc per 100 g of alloy.

According to a still further aspect, a method for improving property of an aluminum alloy casting containing 3.5 to 12.0 Wt % of Si and having a hydrogen content limited to be less than or equal to 0.3 cc per 100 g of alloy, comprising the steps of:

locally irradiating a laser on the periphery of said casting under inert gas atmosphere in a form of a predetermined configuration of line for locally melting the casting; and subsequently curing the locally molten casting for resolidification.

The inert gas may be a mixture gas containing 1 to 7 volume % of hydrogen.

The aluminum alloy casting having the composition set forth above has high laser weldability and hugh ductility. Therefore, such aluminum alloy casting is quite effective in application for a joints for automotive frames.

The aluminum alloy casting according to the present invention does not cause void in the welding portion during laser welding and can provide high strength and ductility for the welding portion. Thus, the aluminum alloy casting according to the invention has high weldability to permit production of high quality structural members not only by laser welding between the aluminum alloy castings but also between the aluminum alloy casting and aluminum plate member or aluminum extruded member.

Also, since the joint may have high strength and high ductility, the thickness of the joint can be reduced to contribute for reduction of weight for the structural member as well as the structure per se. Furthermore, for high weldability, the defect to be caused during casting can be repaired by laser welding to provide high yield in production of elementary casting products.

In particular, the aluminum alloy casting according to the present invention is suitable for application as joints for connecting automotive frames for light weight and high ductility. The aluminum alloy casting according to the invention is particularly advantageous for providing significant improvement of high-impacting property for the automotive chassis.

Furthermore, the laser welding is capable of welding at high speed and with lesser deformation and thus provides high productivity. Furthermore, the laser welding does not always require the wire or so forth which is inherent in the arc welding. This eliminates necessity of removal of the welding reinforcement and thus permit economical welding.

Additionally, by providing local laser processing for a part of the structural member formed from the aluminum alloy casting of the present invention, the mechanical performance, such as strength, fatigue strength, ductility and so forth can be improved. This permits to minimize the necessary thickness of the member. Also, the aluminum alloy casting according to the present invention can be processed even after forming into the structural member to save the material and permit reduction of weight of the transporting equipments, such as the automotive vehicle with improved fuel economy. Therefore, the present invention is valuable in viewpoint of actual production.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DETAILED DESCRIPTION OF THE PREFERRED EMBODIMENT

Figure 1:
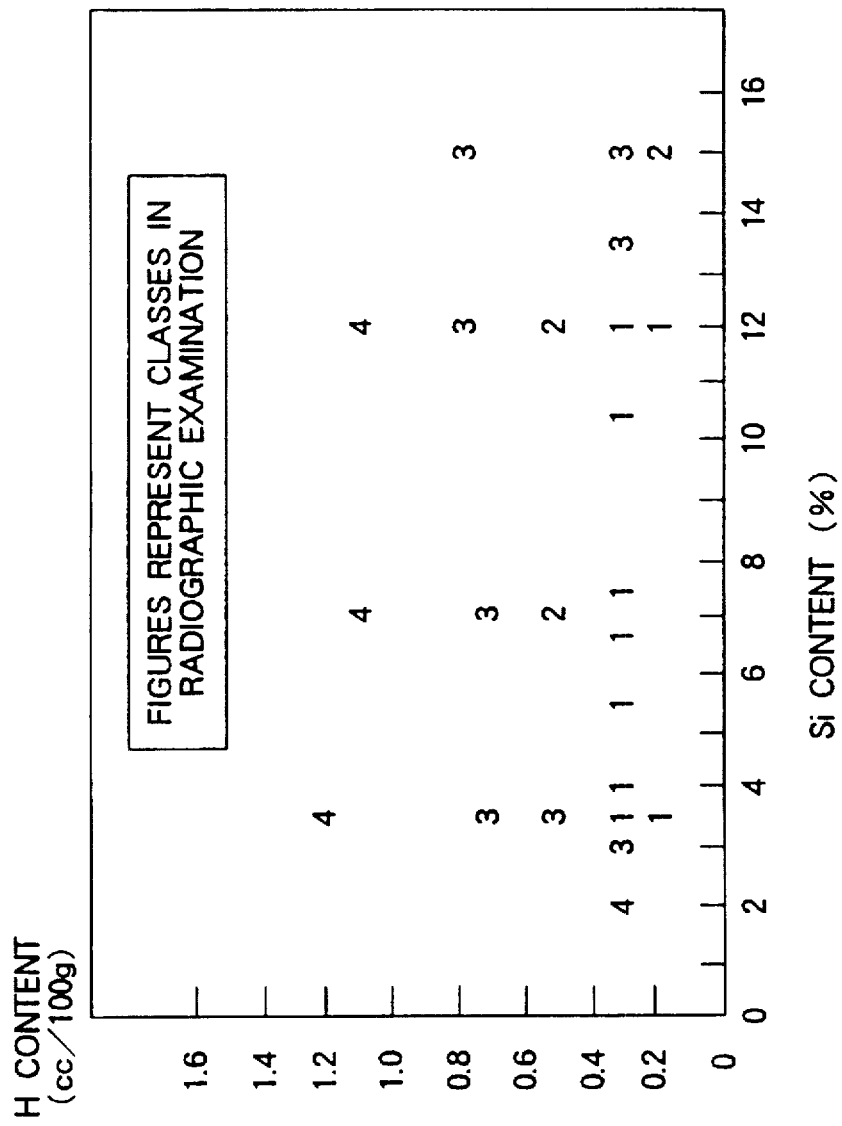
FIG. 1 is a chart showing a relationship between hydrogen content and Si content in an aluminum alloy casting obtained from the embodiments of the present invention, and occurrence of void at welding portions.

The present invention will be discussed hereinafter in greater detail. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In aluminum alloy casting according to the present invention, since hydrogen content of a base material is restricted to be less than or equal to 0.3 cc/10 g alloy, and more preferably less than or equal to 0.15 cc/g alloy, it has smaller amount of material to be a cause of void, such as porosity which frequently caused upon welding.

On the other hand, since Si content is restricted at an appropriate amount, flowability of a melt becomes appropriate so that void and so forth generated during welding can be quickly discharged out of the welding portion. Therefore, no defect due to void may be contained in the molten metal. Furthermore, since iron content in the molten metal is small, the welding portion may have high ductility to provide large elongation at the welding portion. Furthermore, by adding Mg and Cu in the molten metal, the strength can be increased.

The reason for limitation of contents in the composition of the aluminum alloy according to the present invention will be discussed in detail.

Si (silicon)

Si is an element which significantly influences for flowability of the molten metal or melt upon welding. When Si content exceeds 12.0 Wt %, disturbance may be caused in the melt to generate substantially large cavity in the molten metal. On the other hand, when the Si content is less than 3.5 Wt %, the melt will have substantially low flowability and cause a difficulty in discharging the void in the molten metal out of the welding portion to results in residual of blow holes within the molten metal. Accordingly, the content of Si is limited in the range of 3.6% to 12.0 Wt %.

H (hydrogen)

H causes defect due to the blow hole in the molten metal. Therefore, it is preferred to minimize the H content. When H content exceeds 0.3 cc/100 g, the blow hole detects in the molten metal is increased for affecting mechanical property of the aluminum alloy, such as lowering of strength of a welding joint. Accordingly, the hydrogen content is limited to be less than or equal to 0.3 cc in 100 g of alloy, more preferably less than or equal to 0.15 cc/100 g.

As a method of measuring the hydrogen content, there is a method for measuring a pressure under a constant volume by a vacuum heating (Standard Analyzing Method of Metal Material, pp 131–140: Corporation of Titanium Association, published by Maruzen Kabushiki Kaisha, Jan. 30, 1974). With this method, a sample to be measured the hydrogen content is heated under vacuum condition to extract hydrogen gas together with other gases (nitrogen, oxygen, hydrocarbon gas and so forth). These gases are collected in a constant volume vessel to measure a pressure. By heated copper oxide, the collected gas is oxidized to convert the hydrogen in the collected gas into water. After absorbing this water by phosphoric anhydride, the pressure is measured again. Then, on the basis of the pressure difference, the hydrogen content in the sample is measured.

It should be noted that it is also possible to extract an inert gas instead of extracting hydrogen in the sample into the vacuum atmosphere. This process may have shorter measurement period. On the other hand, it is possible to measure the hydrogen content in the sample by measuring the electrical conductivity of the sample.

Fe (iron)

The void defect, such as blow hole in the molten metal can be eliminated by adjusting the H content and Si content as set forth above. Fe degrades strength and ductility of the welding joint. Therefore, in order to certainly provide satisfactory strength and ductility for the aluminum alloy casting, the Fe content has to be limited to be less than or equal to a given amount. Particularly, in order to certainly provide satisfactory level of ductility, limitation of the Fe content is quite effective. Namely, when the Fe content exceeds 0.1 Wt %, it becomes impossible to maintain the ductility of the welding joint at the equivalent level to that of the base material. Therefore, the Fe content is limited to be less than or equal to 0.1 Wt %.

The aluminum alloy casting according to the present invention may contain the following elements if required.

Mg (magnesium)

Since Mg may serve to improve strength of the molten metal, it can be added as required. In order to obtain enhancement of the strength, greater than or equal to 0.05 Wt % of Mg has to be added. However, when the Mg content exceeds 0.6 Wt %, ductility is lowered while the strength is increased. Therefore, the preferred content of Mg is in a range of 0.05 to 0.6 Wt %.

Cu (copper)

Similarly to Mg, Cu serves for enhancing strength of the aluminum alloy casting. For this purpose, greater than or equal to 0.1 Wt % of Cu has to be added. However, when the Cu content exceeds 0.6 Wt %, crack may be caused in the molten metal to make it impossible to use. Accordingly, the Cu content is limited within a range of 0.1 to 0.6 Wt %.

Laser Weldability

Welding condition for laser welding applied for welding of the aluminum alloy casting according to the present invention is not constructed. For instance, upon performing laser welding, the additive, such as wire is not required to be supplied. However, when the reinforcement of the welding is required, it may be better to supply the additive, such as the wire. As the additive in the present invention may be aluminum alloy having the same composition as that of the present invention or aluminum materials having different composition. The laser welding may be applicable not only for connection between aluminum alloy castings together but also for connecting the aluminum alloy casting to the aluminum plate member or the extruded member.

It should be noted that the laser welding to be performed for improving the property of the structural member employing the aluminum alloy casting, must be prepared under the following conditions.

The aluminum alloy is a metal active at a high temperature. It is desirable to perform laser welding with blowing an inert gas, such as argon gas or helium gas as shielding gas for the objective portion for laser welding. By this, the strength of the molten portion can be improved to permit enhancement of strength and thinner thickness of the overall structure.

In place of the inert gas, a mixture gas formed by adding 1 to 7 Wt % of hydrogen to the inert gas may be employed as the shielding gas. By mixing hydrogen, fine spherical void can be uniformly formed in the molten metal. In this method, strength of the molten portion can be enhanced, and in addition, the ductility can be improved. It should be noted that even by increasing the hydrogen content in the aluminum alloy casting, spherical void can be formed in the molten metal. However, in this method, the voids becomes large and not uniform in configuration. Therefore, it is not possible to expect improvement of ductility in this method.

Improvement of Performance of Aluminum Alloy Casting by Irradiation of Laser

By irradiating laser to the structural member of the aluminum alloy casting, the mechanical property thereof can be improved. By locally irradiating the laser to the aluminum alloy casting, the aluminum alloy casting is once molten locally and in a form of a line and subsequently solidified.

Figure 2:
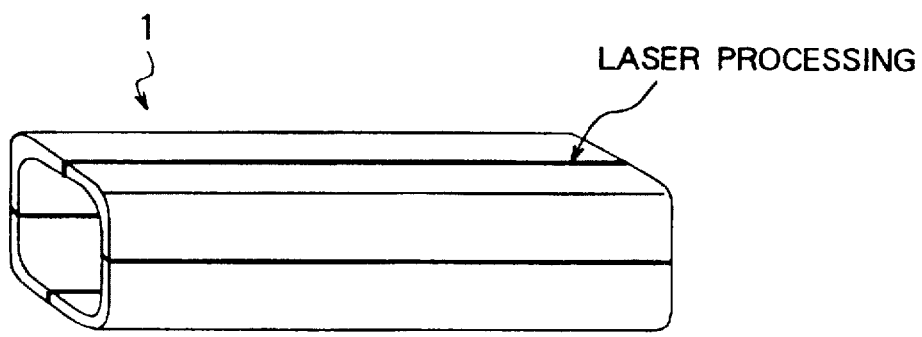
FIG. 2 is an illustration showing a manner of performing laser welding process in straight for a square pipe shaped structure.
Figure 3:
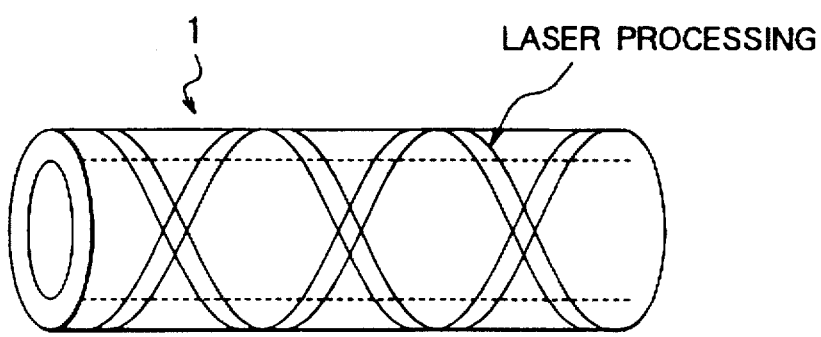
FIG. 3 is an illustration showing a manner of performing laser welding process in spiral fashion for a pipe shaped structure.
Figure 4:
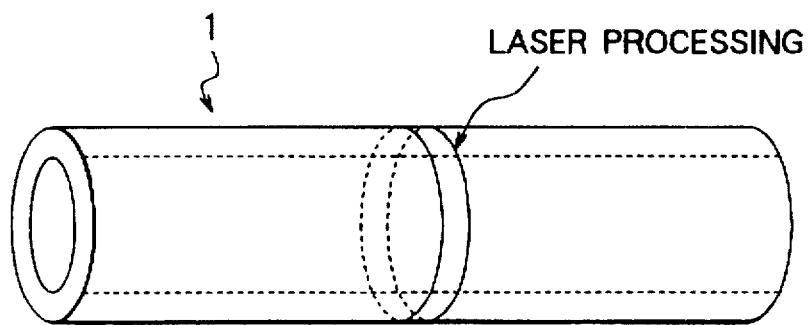
FIG. 4 is an illustration showing a manner of performing laser welding process circumferentially for a pipe shaped structure.

As shown in FIGS. 2 to 4, for a structural member 1 of aluminum alloy casting having an arbitrary section, such as box-shape or pipe-shape and so forth, part of the structural member is irradiated along a longitudinal straight line (FIG. 2), in spiral fashion along the longitudinal direction (FIG. 3) and in circumferential direction (FIG. 4). This causes local melting in a form of line (straight line or curved line). By this, the strength and fatigue strength at the desired portion can be improved and thus can improve the mechanical performance of the overall structural member.

There are no other particular limitation for the laser irradiating condition. For instance, in selection of the laser per se, in order to cause melting of the aluminum alloy, higher than or equal to 3 kW output in case of carbon dioxide laser and higher than or equal to 500 W output in case of YAG laser are desired. The process condition, such as the laser output power, process speed and so forth may be selected appropriately depending upon the type of laser to be used, and thickness and configuration of the portion to the process. The additive, such as the wire and so forth may be used as required.

Results of Experiments

Next, the effect of the embodiments of the present invention will be discussed in comparison with the comparative examples.

EXAMPLE 1

Plate form aluminum alloy casting in a thickness of 2.5 mm were prepared with varying composition as shown in the following table 1. Laser welding test ($CO_2$ laser, output 3.0 kW, welding speed 300 cm/min) was performed for checking laser weldability. The results are shown in FIG. 1. The laser weldability was evaluated on the basis of the void condition in the welded portion according to JIS Z 3105.

TABLE 1

| Test No. | Composition (Wt %) | | | Void | |
|---|---|---|---|---|---|
| | Si | Fe | H cc/100 g | Occurring Rate (JIS Class) | Remarks |
| 1 | 4.0 | 0.06 | 0.1 | 1 | Invention |
| 2 | 4.0 | 0.08 | 0.3 | 1 | Invention |

TABLE 1-continued

| Test No. | Composition (Wt %) | | | Void | |
|---|---|---|---|---|---|
| | Si | Fe | H cc/100 g | Occurring Rate (JIS Class) | Remarks |
| 3 | 4.0 | 0.06 | 0.5 | 3 | Comparative |
| 4 | 4.0 | 0.07 | 0.7 | 3 | Comparative |
| 5 | 2.0 | 0.08 | 0.3 | 4 | Comparative |
| 6 | 3.2 | 0.06 | 0.3 | 3 | Comparative |
| 7 | 3.5 | 0.06 | 0.3 | 1 | Invention |
| 8 | 4.0 | 0.05 | 0.3 | 1 | Invention |
| 9 | 5.5 | 0.05 | 0.3 | 1 | Invention |
| 10 | 6.7 | 0.06 | 0.3 | 1 | Invention |
| 11 | 7.2 | 0.04 | 0.3 | 1 | Invention |
| 12 | 10.5 | 0.07 | 0.3 | 1 | Invention |
| 13 | 12.0 | 0.08 | 0.3 | 1 | Invention |
| 14 | 13.5 | 0.06 | 0.3 | 3 | Comparative |
| 15 | 15.0 | 0.07 | 0.3 | 3 | Comparative |

As can be clear from the foregoing table 1, by limiting the hydrogen content to be less than or equal to 0.3 cc/100 g, and by limiting the Si content within a range of 3.5 to 12.0%, occurrence of void defect at the welding portion can be eliminated. In addition, the relationship between the void occurring condition at the welding portion and hydrogen and Si contents is shown in the foregoing table 1.

EXAMPLE 2

Plate form aluminum alloy casting in a thickness of 2.6 mm were prepared with varying composition as shown in the following table 2. Laser welding test ($CO_2$ laser, output 4.0 kW, welding speed 400 cm/min) was performed for checking elongation of the welding joint. The results are shown in the table 2. Elongation was evaluated by obtaining respective two JIS Z 2210-5 test pieces and performing tensile test.

TABLE 2

| Test No. | Composition (Wt %) | | | Elongation of Welding Joint (%) | | | |
|---|---|---|---|---|---|---|---|
| | Si | Fe | H cc/100 g | 1st | 2nd | Average | Remarks |
| 21 | 7.0 | 0.05 | 0.08 | 15 | 16 | 15.5 | Invention |
| 22 | 6.9 | 0.10 | 0.07 | 12 | 11 | 11.5 | Invention |
| 23 | 7.0 | 0.18 | 0.07 | 6 | 7 | 6.5 | Comparative |
| 24 | 7.1 | 0.25 | 0.08 | 4 | 4 | 4.0 | Comparative |
| 25 | 7.0 | 0.31 | 0.07 | 2 | 3 | 2.5 | Comparative |
| 26 | 7.0 | 0.50 | 0.07 | 1 | 2 | 1.5 | Comparative |
| 27 | 7.1 | 0.73 | 0.08 | 1 | 1 | 1.0 | Comparative |

As can be clear from the foregoing table 2, by limiting the Fe content less than or equal to 0.10 Wt %, lowering of ductility can be prevented.

EXAMPLE 3

Mating plate form aluminum alloy castings of 3.0 mm in thickness made of aluminum alloy containing 7.0 Wt % of Si, 0.1 Wt % of Fe and 0.2 cc/100 g of hydrogen, laser welding by means of a laser welding apparatus was performed. Then, radiographic examination and checking of strength and ductility of the welding joint was performed. The results are shown in the following table 3. It should be noted that the laser welding was performed employing the carbon dioxide laser with the output of 5.5 kW and the welding speed 200 cm/min. For evaluation, respectively three test pieces are used.

TABLE 3

| Class of Radiographic Examination | Joint Strength (K/mm²) | Elongation (%) | Break Position |
|---|---|---|---|
| A | 1 | 205 | 11 | Base Material |
| B | 1 | 206 | 12 | Base Material |
| C | 1 | 209 | 11 | Base Material |
|   | Average | 207 | 11.3 |   |

As can be clear from the table 3, in all case, no defect in a form of blow hole nor defect in a form of crack is found in the welding portion. Also, the results of tensile test of the joint shows breakage caused in the base material in all three test pieces. Each joints exhibited large elongation rate over 10%.

EXAMPLE 4

Mating plate form aluminum alloy castings of 2.5 mm thick made of aluminum alloy containing 6.5 Wt % of Si, 0.08 Wt % of Fe and 0.2 cc/100 g of hydrogen, and further 0.02 to 0.9 Wt % of Mg, laser welding by means of a laser welding apparatus was performed. Then, strength and ductility of the welding joint were checked.

The results are shown in the following table 4. It should be noted that the laser welding was performed employing the carbon dioxide laser with the output of 5.0 kW and the welding speed 250 cm/min.

TABLE 4

| Test No. | Mg Content (%) | Result of Tensile Test of Welding Joint | | | Remarks |
|---|---|---|---|---|---|
| | | Joint Strength | Elongation | Break Position | |
| 31 | 0.03 | 185 | 13 | base | Comparative |
| 32 | 0.05 | 186 | 13 | base | Invention |
| 33 | 0.11 | 186 | 13 | base | Invention |
| 34 | 0.21 | 191 | 12 | base | Invention |
| 35 | 0.35 | 198 | 11 | base | Invention |
| 36 | 0.48 | 202 | 10 | base | Invention |
| 37 | 0.60 | 208 | 10 | base | Invention |
| 38 | 0.71 | 215 | 8 | base | Comparative |
| 39 | 0.92 | 226 | 8 | base | Comparative |

As can be clear from the foregoing table 4, addition of Mg results in improvement of strength of the welding joint. However, in turn, addition of Mg causes lowering of ductility. In order to strengthen the welding portion, greater than or equal to 0.05 Wt % of Mg has to be added. On the other hand, in order to attain elongation of the joint grater than or equal to 10%, the Mg content should be less than or equal to 0.6 Wt %.

EXAMPLE 5

Mating plate form aluminum alloy castings of 2.5 mm thick made of aluminum alloy containing 6.5 Wt % of Si, 0.08 Wt % of Fe and 0.2 cc/100 g of hydrogen, and further 0.02 to 0.8 Wt % of Cu, laser welding by means of a laser welding apparatus was performed. Then, strength and ductility of the welding joint were checked. The results are shown in the following table 5. It should be noted that the laser welding condition is the same as that of the Example 4.

TABLE 5

| Test No. | Cu Content (%) | Joint Strength (N/mm²) | Break Position | Crack in Molten Metal | Evaluation | Remarks |
|---|---|---|---|---|---|---|
| 41 | 0.02 | 181 | base | no | Δ | Comparative |
| 42 | 0.06 | 182 | base | no | Δ | Comparative |
| 43 | 0.10 | 184 | base | no | ○ | Invention |
| 44 | 0.21 | 185 | base | no | ○ | Invention |
| 45 | 0.35 | 189 | base | no | ○ | Invention |
| 46 | 0.42 | 192 | base | no | ○ | Invention |
| 47 | 0.48 | 195 | base | no | ○ | Invention |
| 48 | 0.51 | 201 | base | no | ○ | Invention |
| 49 | 0.60 | 207 | base | no | ○ | Invention |
| 50 | 0.72 | 120 | welded metal | present | X | Comparative |
| 51 | 0.82 | 59 | welded metal | present | X | Comparative |

As can be seen from Table 5, it can be appreciated that the strength is increased by adding Cu. In order to strengthen the welding joint, greater than or equal to 0.10 Wt % of Cu has to be added. If the Cu content exceeds 0.6 Wt %, crack will be caused in the welded metal

EXAMPLE 6

With respect to a square pipe shaped structural member of aluminum alloy containing 6 Wt % of Si, 0.05 Wt % of Fe and 0.05 cc/100 g of hydrogen and having 2 mm of wall thickness was partially welded in straight line form by laser with blowing argon gas having 99.999% of purity. Laser welding was performed for four positions under the condition of 5.0 kW of the output and 400 cm/min of process speed by means of carbon dioxide laser. The strength and ductility of the processed structural material were compared with those of non-processed material.

TABLE 6

| Kind | Laser Process | Strength (N/mm²) |
|---|---|---|
| Material of Invention | Done | 212 |
| Non-Processed Material | Not Done | 200 |

As a result, as shown in the foregoing table 6, the material of the present invention increases strength in the extent of 6% versus the non-processed material, without varying the thickness. This, in turn, means that the equivalent strength to the non-processed material may be obtained with 6% reduced thickness. Therefore, weight may also be required in an extent corresponding to 6 Wt %.

EXAMPLE 7

For the pipe shaped structural member of aluminum alloy containing 7 Wt % of Si and 0.05 cc/100 g of hydrogen and having 3 mm of thickness, laser welding process was performed along a spiral line (see FIG. 3). The fatigue strength of the processed structural member is compared with that of the non-processed member. The laser welding processing condition is the same as that of the embodiment 6. The results are shown in the following table 7.

TABLE 7

|  | Laser Process | Fatigue Strength (N/mm$^2$) | |
|---|---|---|---|
|  |  | 10$^5$ Times | 10$^6$ Times |
| Material of Invention | Done | 201 | 145 |
| Non-Processed Material | Not Done | 170 | 115 |

As shown in the foregoing table 7, the results shows that the present invention is far superior to the non-processed material in terms of the fatigue strength of the pipe.

EXAMPLE 8

Pipe form structural member of aluminum alloy casting containing 6.5 Wt % of Si and 0.07 cc/100 g of hydrogen, and having the thickness of 2.0 mm. For such material structural member, laser welding process was performed in circumferential direction (see FIG. 4) for checking the strength. The laser welding condition was that a mixture gas of argon and 0 to 15 Wt % of hydrogen being employed, CO$_2$ laser with the output of 5.0 kW and process speed of 350 cm/min.

TABLE 8

|  | Hydrogen Content (%) | Strength (N/mm$^2$) | Elongation (%) | Unitary Evaluation |
|---|---|---|---|---|
| Comparative | 0 | 185 | 9 | — |
| Comparative | 0.5 | 185 | 9 | Δ |
| Invention | 1 | 180 | 12 | ○ |
| Invention | 3 | 173 | 13 | ○ |
| Invention | 5 | 168 | 13 | ○ |
| Invention | 7 | 152 | 12 | ○ |
| Comparative | 8 | 100 | 4 | X |
| Comparative | 10 | 87 | 1 | X |
| Comparative | 12.5 | 65 | 1 | X |
| Comparative | 15 | 51 | 1 | X |

As shown in the foregoing table 8, by employing the mixture gas containing 1 to 7 volume % of hydrogen with the argon gas is employed as the shielding gas, the ductility of the structural member can be enhanced with maintaining the overall strength thereof.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A method, comprising:
    irradiating the periphery of a casting with a laser under a gas, thereby melting a portion of said casting; and
    resolidifying said portion of said casting;
    wherein said casting consists essentially of 3.5 to 12.0 wt % Si, at most 0.10 wt % Fe, at most 0.3 cc hydrogen per 100 g of said casting, and the balance aluminum and inevitable impurities, and
    said gas comprises an inert gas.
2. The method of claim 1, wherein said gas consists essentially of 1–7 volume % of hydrogen and an inert gas.
3. The method of claim 1, further comprising:
    forming said casting into a structural member, prior to said irradiating.
4. The method of claim 1, wherein said casting further consists essentially of at least one member selected from the group consisting of 0.05 to 0.6 wt % Mg and 0.1 to 0.6 wt % Cu.
5. The method of claim 1, wherein said casting has a hydrogen content of at most 0.15 cc per 100 g of said alloy.
6. The method of claim 1, wherein said casting has a hydrogen content of at most 0.15 cc per 100 g of said alloy.
7. The method of claim 1, wherein said casting has a hydrogen content of 0.07 to 0.3 cc per 100 g of said alloy.
8. The method of claim 1, wherein said casting has an Fe content of 0.04 to 0.10 wt %.
9. The method of claim 1, wherein said casting is a joint of an automotive frame.
10. A method of improving the strength and fatigue strength of a joint of an automotive frame, comprising:
    irradiating the periphery of a casting with a laser under a gas, thereby melting a portion of said casting; and
    resolidifying said portion of said casting;
    wherein said casting consists essentially of 3.5 to 12.0 wt % Si, at most 0.10 wt % Fe, at most 0.3 cc hydrogen per 100 g of said casting, and the balance aluminum and inevitable impurities,
    said gas comprises an inert gas, and
    said casting is a joint for an automotive frame.
11. The method of claim 10, wherein said casting further consists essentially of at least one member selected from the group consisting of 0.05 to 0.6 wt % Mg and 0.1 to 0.6 wt % Cu.
12. The method of claim 10, wherein said casting has a hydrogen content of at most 0.15 cc per 100 g of said alloy.
13. The method of claim 10, wherein said casting has a hydrogen content of at most 0.15 cc per 100 g of said alloy.
14. The method of claim 10, wherein said casting has a hydrogen content of 0.07 to 0.3 cc per 100 g of said alloy.
15. The method of claim 10, wherein said casting has an Fe content of 0.04 to 0.10 wt %.
16. The method of claim 10, wherein said gas consists essentially of 1–7 volume % of hydrogen and an inert gas.

* * * * *